United States Patent
Liu

(10) Patent No.: US 8,968,459 B1
(45) Date of Patent: Mar. 3, 2015

(54) SELF-HEALING SUPERHYDROPHOBIC COATING COMPOSITION AND METHOD OF PREPARATION

(71) Applicant: Jiong Liu, East Brunswick, NJ (US)

(72) Inventor: Jiong Liu, East Brunswick, NJ (US)

(73) Assignee: NEI Corporation, Somerset, NJ (US)

( * ) Notice: Subject to any disclaimer, the term of this patent is extended or adjusted under 35 U.S.C. 154(b) by 0 days.

(21) Appl. No.: 14/103,047

(22) Filed: Dec. 11, 2013

(51) Int. Cl.
  *C09D 183/06* (2006.01)
  *C08K 3/20* (2006.01)
  *C09D 183/08* (2006.01)
  *C08K 3/36* (2006.01)

(52) U.S. Cl.
  CPC ............... *C09D 183/08* (2013.01); *C08K 3/36* (2013.01)
  USPC .............. 106/287.16; 106/13; 106/286.4; 106/286.5; 106/287.17; 524/492; 524/493; 524/496; 524/588; 528/34; 528/39; 528/42

(58) Field of Classification Search
  None
  See application file for complete search history.

(56) References Cited

U.S. PATENT DOCUMENTS

| | | | | |
|---|---|---|---|---|
| 6,649,266 | B1 * | 11/2003 | Gross et al. | 428/410 |
| 2005/0181146 | A1 * | 8/2005 | Yoneyama et al. | 428/1.31 |
| 2009/0011222 | A1 * | 1/2009 | Xiu et al. | 428/323 |
| 2012/0045954 | A1 * | 2/2012 | Bleecher et al. | 442/80 |
| 2013/0095290 | A1 * | 4/2013 | Muisener et al. | 428/141 |

FOREIGN PATENT DOCUMENTS

JP  2006-111778  *  4/2006

* cited by examiner

*Primary Examiner* — Marc Zimmer
(74) *Attorney, Agent, or Firm* — William L. Botjer

(57) ABSTRACT

A durable superhydrophobic coating, which coating has the ability to self-heal, similar to the regeneration function observed in biological systems. The coating composition comprises the reaction products of at least one fluorine-containing silane compound (A), at least one hydrolysable compound (B), at least one polysiloxane compound (C), at least one relatively large-sized ceramic particle (I), at least one nano-sized ceramic particle (II) and at least one solvent.

22 Claims, 2 Drawing Sheets

SELF-HEALING SUPERHYDROPHOBIC COATING COMPOSITION AND METHOD OF PREPARATION

STATEMENT OF GOVERNMENT SUPPORT OF THE INVENTION

This invention was made with Government support under Contract No. W911 W6-12-C-0006 awarded by the Department of Army. The Government has certain rights in the invention.

FIELD OF THE INVENTION

This invention relates generally to a superhydrophobic coating. More particularly, the invention relates to a superhydrophobic coating that has the ability to self-heal, similar to the regeneration function observed in biological systems.

BACKGROUND OF THE INVENTION

Superhydrophobic surfaces exhibit a high degree of water-repellency. Water forms almost spherical droplets on them that readily roll away. This phenomenon is known as the "lotus effect", which has attracted tremendous attention in the past few years due to the large number of potential applications. A generally accepted definition for a superhydrophobic surface is a surface on which the contact angle of a water droplet exceeds 150° and the roll-off angle (i.e., the minimum tilt angle of the surface at which a droplet starts rolling on it) is less than 10°. The superhydrophobic effect, namely superhydrophobicity, results from a synergism of proper surface roughness and low surface energy. The roughness is usually generated by introducing a porous surface layer having micro- and/or nano-structures. When covered with water, the porous surface layer can entrap air, resulting in a composite interface where water only partially wets the solid substrate. Besides the proper surface roughness, an intrinsically hydrophobic surface layer is essential to obtain the superhydrophobicity.

Coating a non-superhydrophobic surface is a convenient way to create a superhydrophobic surface. To date, many ways to produce superhydrophobic coatings have been reported. However, very few examples are available for real applications, for they are usually not durable. This seriously limits the practical applications of superhydrophobic surfaces. When exposed to an outdoor environment, low surface energy materials of the superhydrophobic coatings can be decomposed by sunlight, and micro/nanostructures of the surfaces are easily destroyed under severe weather conditions, thus leading to permanent destruction of the superhydrophobicity. In contrast to artificial superhydrophobic coatings, natural plant leaves like lotus leaves can maintain their superhydrophobicity by repairing the damaged surface layer with a continuously-secreting hydrophobic epicuticular wax (C. Neinhuis, K. Koch and W. Barthlott, Planta, 213, 427 (2001)). It is believed that a self-healing function similar to that of the plant leaves is needed for a durable superhydrophobic coating.

SUMMARY OF THE INVENTION

One aspect of the present invention is to provide a composition capable of forming a durable superhydrophobic coating, which has the ability to self-heal, similar to the regeneration function observed in biological systems. The coating composition comprises the reaction products of at least one fluorine-containing silane compound (A), at least one hydrolysable compound (B), at least one polysiloxane compound (C), at least one relatively large-sized ceramic particle (I), at least one nano-sized ceramic particle (II) and at least one solvent. Another aspect of the present invention is to provide a method for preparing the coating composition.

DETAILED DESCRIPTION OF THE PREFERRED EMBODIMENTS

Figure 1:
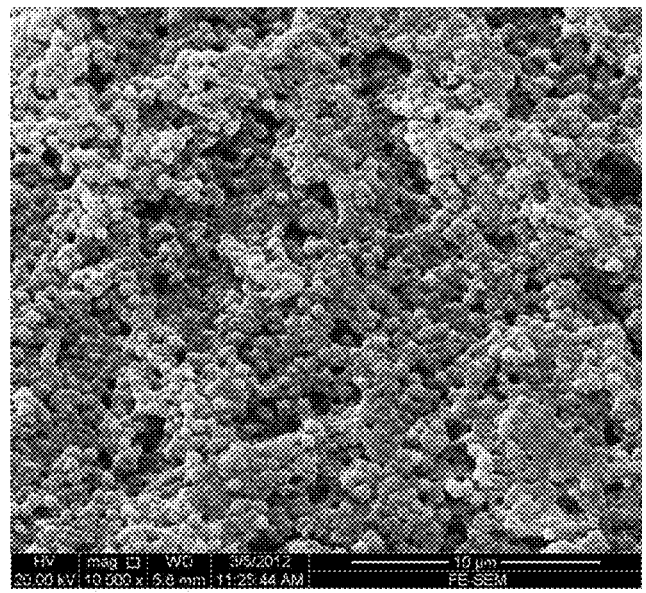
FIG. 1: SEM micrographs of coating Example 1 showing micro-roughness at 10 μm scale bar.

The coating composition comprises the reaction products of at least one fluorine-containing silane compound (A), at least one hydrolysable compound (B), at least one polysiloxane compound (C), at least one relatively large-sized ceramic particle (I), at least one nano-sized ceramic particle (II) and at least one solvent.

Compounds (A) as used in the present invention are represented by general formula (1).

$$R_f\text{—}R\text{—}\underset{\underset{(R^2)_i}{|}}{Si(OR^1)_{3-i}} \quad (1)$$

wherein letter i is 0 or 1;
$R_f$ is $C_nF_{2n+1}$, wherein n is an integer of 1 to 20, preferably 4 to 14, for example, $C_4F_9$—, $C_6F_{13}$—, $C_8F_{17}$—, $C_{10}F_{21}$—, $C_{12}F_{25}$—,
R is a divalent hydrocarbon group having 1 to 10 carbon atoms, preferably 1 to 4 carbon atoms;
$R^1$ is an alkyl group having 1 to 6 carbon atoms, preferably 1 to 4 carbon atoms; and
$R^2$ is an alkyl group having 1 to 6 carbon atoms, preferably 1 to 4 carbon atoms.

Preferred compounds (A) include heptadecafluoro-1,1,2,2-tetrahydrodecyl-1-triethoxysilane, tridecafluoro-1,1,2,2-tetrahydrooctyl-1-triethoxysilane, as they are commercially available.

Compounds (B) as used in the present invention are represented by general formula (2).

$$R^3_k\text{-}MX_{j-k} \quad (2)$$

wherein M represents an element of valency j+k, selected from the group consisting of Si, Al, Ti, Zr, B, Ge, V, Pb, Sn and Zn, preferably Si, Al, Ti and Zr or mixture thereof;
X is a hydrolysable group;
$R^3$ is a non-hydrolysable group;
letter k is equal to 3 or 4 depending on the valence of M; and
letter j is equal to 0, 1 or 2, preferably is equal to 0 or 1.

The hydrolysable groups present in compounds (B) may be identical or different and are generally capable of hydrolyzing in the presence of water. Preferably, the hydrolysable groups upon hydrolysis yield groups that can lead to condensation reactions, such as hydroxyl groups.

Examples of hydrolysable groups X are alkoxy (particularly $C_{1-4}$-alkoxy, such as, e.g., methoxy, ethoxy, n-propoxy and butoxy), aryloxy (particularly $C_{6-10}$-aryloxy, e.g., phenoxy), acyloxy (particularly C1-4-acyloxy, such as, e.g., acetoxy and propylonyloxy) and alkylcarbonyl (e.g., acetyl).

Non-hydrolysable group $R^3$ may be the same or different and are generally not capable of hydrolyzing under acidic or basic aqueous conditions. Examples of non-hydrolysable groups are $C_{1-30}$ alkyl group, $C_{6-30}$ aryl group, and $C_{7-30}$ aralkyl group.

Preferred compounds (B) include tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n-propyl orthotitanate, tetraethyl zirconate, tetra-iso-propyl zirconate, tetra-n-propyl zirconate, aluminum tri-n-propoxide, aluminium isopropoxide, aluminium sec-butoxide and the like. Single compound or mixtures of compounds (B) may be used.

Compounds (C) as used in the present invention are represented by general formula (3).

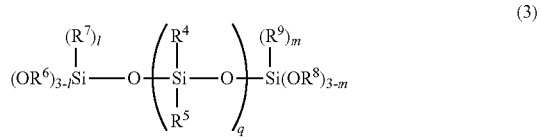

(3)

wherein letter l is an integer of 0 to 3, m is an integer of 0 to 3, q is an integer of 10 to 500;
each of $R^4$ and $R^5$ independently represent an alkyl group having 1 to 6 carbon atoms or a phenyl group;
each of $R^6$, $R^7$, $R^8$ and $R^9$ independently represent an alkyl group having 1 to 6 carbon atoms.

One important aspect of the present invention is that compounds (C) are an essential component of the coating composition for achieving the self-healing function in the final coating, as will be demonstrated in Examples. As shown by the general formula, compounds (C) contain a polysiloxane polymeric chain with alkoxy-terminated end groups. A preferable embodiment in general formula (3) is that letters l and m are not simultaneously equal to 3. Another important aspect of compounds (C) is that letter q is an integer of 10 to 500, and preferably is an integer of 20 to 100.

The coating composition according to the present invention contains at least one relatively large-sized ceramic particle (I). Examples of particle (I) include $SiO_2$, $Al_2O_3$, $ZrO_2$, $ZnO$, $TiO_2$, $SnO_2$. Such large sized particles have an average particle size of 50 to 2000 nm, preferably 100 to 800 nm, and can be incorporated in an amount of 10 to 90 wt %, preferably in an amount of 40-80 wt %, of the finished coating.

The coating composition according to the present invention also contains at least one nano-sized ceramic particle (II). Examples of particle (II) include $SiO_2$, $Al_2O_3$, $ZrO_2$, $ZnO$, $TiO_2$, $SnO_2$. Such nano-sized particles have an average particle size of 5 to 200 nm, preferably 10 to 100 nm, and can be incorporated in an amount of 10 to 90 wt %, preferably in an amount of 40-80 wt %, of the finished coating.

In an important aspect of the present invention, the volume ratio of particle (I) to particle (II) is in a range of 10:1 to 1:10, preferably in a range of 5:1 to 1:5, more preferably in a range of 3:1 to 1:3.

The coating composition according to the present invention further contains at least one solvent. Suitable solvents include those that are miscible with water, such as aliphatic alcohols (e.g., methanol, ethanol, and isopropanol); ketones (e.g., acetone and methyl ethyl ketone); and tetrahydrofuran etc. The solvent as used herein may be a single organic solvent and a mixture of two or more organic solvents. The solvent preferably contains at least 1 wt % water.

The method for preparing the coating composition includes providing independently three liquid solutions, i.e., a precursor solution using compounds (A), (B) and (C) as starting materials, a liquid dispersion of the relatively large-sized ceramic particle (I) and a liquid dispersion of the nano-sized particle (II), and combining the three solutions to form a coating solution having a pH of about 1-6.5.

It is preferred that the molar ratio of components (A) to (B) ranges from 1:0.5 to 1:10 and particularly preferred from 1:1 to 1:5; and the molar ratio of components (A) to (C) ranges from 1:1 to 500:1 and particularly preferred from 5:1 to 100:1.

The preparation of the precursor solution involves a sol-gel reaction, where starting compounds (A), (B) and (C) first undergo hydrolysis reactions in a solvent containing water, preferably in acidic condition having a pH of 1-6.5. The pH of the solution is preferably adjusted by adding common acids such as hydrochloride acid, nitric acid, sulfuric acid and the like alone or in admixture. Following the hydrolysis, polycondensation reactions may occur forming the polycondensates of starting materials. The amount of water contained in the solvent is at least a stoichiometric amount that allows all the hydrolysable groups in components (A), (B) and (C) to be hydrolyzed. The acid used preferably follows a molar ratio of (A)+(B)+(C) to acid ranging from 1:0.001 to 1:0.1.

A preferred method for preparation of liquid dispersions of particles (I) and (II) is through sol-gel synthesis. For example, silica particle dispersions or colloidal silica can be synthesized using a well-known Stober process. Other preparation methods may involve mechanical or ultrasonication of solid powders in a suitable solvent. These particle dispersions are typically commercially available and easy to obtain.

In accordance with the present invention, it is important that the final coating composition have a pH of about 1-6.5. In this defined pH range, the condensation reactions in the coating solution are inhibited and aggregation of the particles minimized so that a stable coating solution can be obtained. The coating composition according to the present invention may be applied to a suitable substrate either shortly after its preparation (e.g., up to one hour), or after storing at room temperature for a long time (e.g., up to a month).

The coating composition can be applied to a suitable substrate using one of the conventional coating techniques. Examples for such techniques include dipping, flooding, casting, spinning, spraying and brushing. Dipping, flooding and spraying are particularly preferred according to the present invention. After coating application the wet coating is typically flash dried at room temperature to allow evaporation of the solvents. Finally, the coating is cured or dried at elevated temperatures between about 80° C. and 200° C., over a period of 1 minute to 10 hours. The curing time has an inverse relationship with curing temperature.

Upon drying or curing the coating composition, the solvent in the wet coating evaporates, and the polycondensation reactions involving all the components take place to near completion, leading to a mechanically stable solid coating filled with particles. In preferred embodiments, the coating may exhibit a water contact angle of above 150° and a water sliding angle of less than 10°. The solid coating has a multi-scale roughness (i.e., at micro- and nano-scales) and self-similar structure. The coating structure exhibits self-repairing characteristics, i.e., its surface patterns can be regenerated as a result of normal wear, since removing a layer of material will expose a new rough surface due to the self-similarity of the coating structure.

In another important aspect of the present invention, the coating formed from the composition comprises an inorganic-organic hybrid binder capable of self-healing. The self-healing function, as will be demonstrated in Examples, is enabled by incorporating compounds (C) into the composition. Those skilled in the art will recognize that compounds (C) contain low-molecular-weight polysiloxane segments that are intrinsically hydrophobic. We have surprisingly found that those polysiloxane segments are capable of recovering the surface hydrophobicity once the surface layer is contaminated or damaged. Without wishing to be bound to any theory, the inventor believes that two mechanisms are responsible for the self-healing action of the innovative superhydrophobic coating. First, the low-molecular-weight polysiloxane molecules that are not fully reacted (i.e., terminal alkoxy groups remain and do not form covalent bonds with other starting materials) in the binder can migrate to the surface layer through a diffusion process. Second, the covalently attached polysiloxane segments embedded in the surface layer can go through conformational changes such that the hydrophobic backbone reorients onto the surface. Both scenarios are highly likely as they are thermodynamically favorable processes.

The self-healing action of the superhydrophobic coating according to the present invention may be triggered by heat. In a preferred embodiment of present invention, the self-healing ability of the superhydrophobic coating is dependent on the temperature. A damaged coating may be healed in several minutes at elevated temperatures (e.g., 80° C.-150° C.). However, as those skilled in the art will realize, direct heating may not be necessarily needed for self-healing to occur. Exposing the coating to strong sunlight for an extended period may enable the self-healing function.

The self-healing superhydrophobic coatings formed from the composition according to the present invention can be used to produce water-repellent surfaces and self-cleaning coatings. The coatings can be used for corrosion protection or anti-icing applications for buildings, vehicles, and other structures. The substrates that can be coated include glass, plastic, metal, ceramic, polymer, composites, etc.

Without intending to limit it in any manner, the following examples shall illustrate the invention further.

Example 1

First, a precursor solution was synthesized using heptadecafluoro-1,1,2,2-tetrahydrodecyl-1-triethoxysilane (HFTEOS), i.e., compound (A) having a formula of $C_8F_{17}$—$CH_2$—$CH_2$—$Si(OCH_2CH_3)_3$, and tetraethylorthosilicate (TEOS), i.e., compound (B) having a formula of $Si(OCH_2CH_3)_4$, as the starting materials. The HFTEOS and TEOS were hydrolyzed by mixing with ethanol, water and hydrogen chloride with a molar ratio of HFTEOS:TEOS:$C_2H_5OH$:$H_2O$:HCl=0.3:0.7:3.8:5:4.8×10$^{-3}$ under vigorous stirring at 60° C. for 90 min. The precursor solution was then diluted to 10 wt % of solid content with isopropanol. 25 gram of the 10 wt % precursor solution was then mixed with 2 gram of Siltech TC11-9C (from Siltech Corporation, Canada), i.e., compound (C), a functionalized linear polydimethylsiloxane having about 50 dimethylsiloxane units, with three methoxy groups on each end. The solution was further mixed with 12.2 gram IPA-ST-UP (from Nissan Chemical America Corporation), an isopropanol dispersion of an elongated silica nanoparticle having a diameter of 9-15 nm with a length of 40-100 nm; 4.62 gram MP-4540M (from Nissan Chemical America Corporation), an aqueous colloidal silica with an average particle size about 450 nm; and 8.28 gram isopropanol. The final coating solution was applied to a glass slide by dip coating. The coated samples were cured at 150° C. for 30 min.

Figure 2:
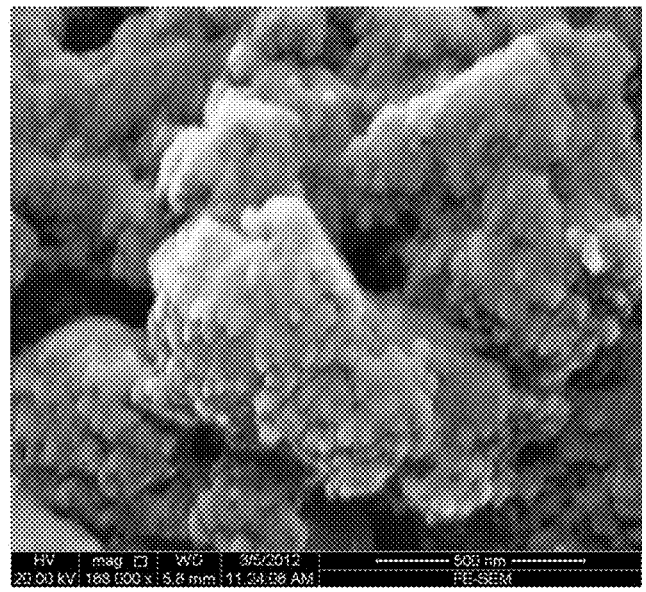
FIG. 2: SEM micrographs of coating Example 1 showing nano-roughness with hierarchical structures at 500 nm scale bar.
Figure 3:
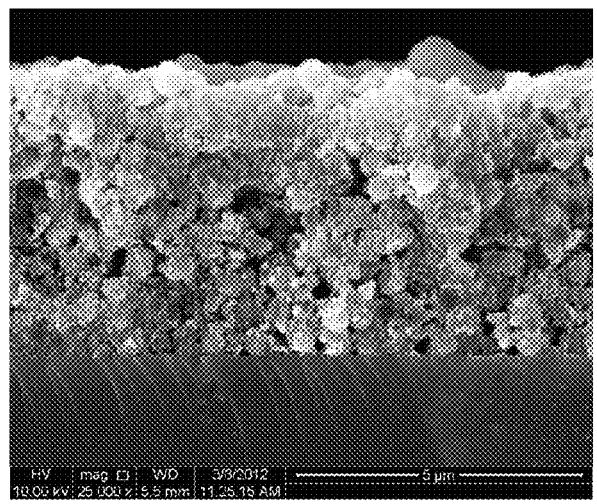
FIG. 3: SEM micrograph of cross section for coating Example 1 on glass showing self-similarity.

The dried coating was examined using a scanning electron microscope. FIGS. 1 and 2 show two SEM micrographs of this sample at different scales; and FIG. 3 shows a cross-sectional view of the coating. The coating has a hierarchical nanostructured morphology (i.e., multi-scale roughness), which is self-similar throughout the coating. The hydrophobicity of the coating was evaluated by measuring the advancing, receding and roll-off angles with a contact angle goniometer. The result is listed in Table 1. The coating shows superhydrophobicity.

Example 2

The same procedure as described in Example 1 was repeated to prepare a coated glass slide. A wear test was done to demonstrate the mechanical stability of the superhydrophobic coating. In this test, a 100 g weight with a diameter of 2 cm was applied to a steel wool of #000 fine grade to scratch the coatings. The superhydrophobic coatings maintained its superhydrophobicity after 100 repeated passes with steel wool.

Example 3

Figure 4:
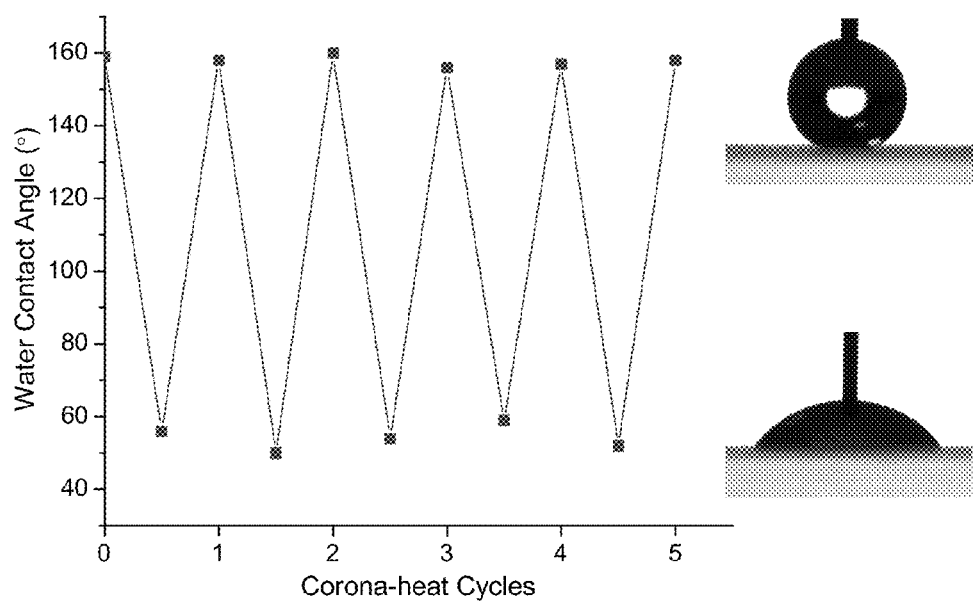
FIG. 4: Water contact angle as a function of corona-heat cycle for a self-healing superhydrophobic surface as described in Example 3.

The same procedure as described in Example 1 was repeated to prepare a coated glass slide. The coating showed superhydrophobicity—water droplets rolled off easily on its surface. The following experiments were carried out to demonstrate the self-healing function of the coating. The freshly prepared coating was damaged artificially by a corona treatment under ambient laboratory conditions. After the corona treatment, the coating lost its superhydrophobicity. Instead of forming droplets, water spread and stuck to the surface. The damaged samples was then heated at 150° C. for 5 min, the superhydrophobicity was restored. Such a self-healing action remained when the sample went through multiple damage-and-heal cycles (see FIG. 4). The superhydrophobicity remained unchanged even after 5 cycles of corona-heat treatment. The self-healing could be performed repeatedly at lower heat treatment temperatures simply by increasing the treatment time.

Comparative Example 1

The same procedure as described in Example 1 was repeated to obtain a coated glass slide except that Siltech TC11-9C was not added. The hydrophobicity of the coating was evaluated by measuring the advancing, receding and roll-off angles with a contact angle goniometer. The result is listed in Table 1. The coated sample showed superhydrophobicity—water droplets rolled off easily on its surfaces. The freshly prepared coating was then damaged artificially by a corona treatment under ambient laboratory conditions. After the corona treatment, the coating lost its superhydrophobicity. Instead of forming droplets, water spread and stuck to the surface. The damaged samples was then heated at 150° C. for 5 min, the superhydrophobicity could not be restored as for Example 3. This result indicates that in the absence of the polysiloxane compound (Siltech TC11-9C in this case), the self-healing action could not be achieved.

Comparative Example 2

The same procedure as described in Example 1 was repeated to obtain a 10 wt % precursor solution. 25 gram 10 wt % precursor solution (without adding Siltech TC11-9C) was then mixed with 24.195 gram IPA-ST-UP and 0.805 gram isopropanol. The final coating solution was applied to a glass slide by dip coating. The coated samples were cured at 150° C. for 30 min. The hydrophobicity of the coating was evaluated by measuring the advancing, receding and roll-off angles with a contact angle goniometer. The result is listed in Table 1. The coating does not show superhydrophobicity. This result indicates that superhydrophobicity could not be achieved in the absence of a relatively large-sized ceramic particle (I) in the coating composition.

Comparative Example 3

The same procedure as described in Example 1 was repeated to obtain a 10 wt % precursor solution. 25 gram of the 10 wt % precursor solution (without adding Siltech TC11-9C) was then mixed with 9.235 gram MP-4540M and 15.765 gram isopropanol. The final coating solution was applied to a glass slide by dip coating. The coated samples were cured at 150° C. for 30 min. The hydrophobicity of the coating was evaluated by measuring the advancing, receding and roll-off angles with a contact angle goniometer. The result is listed in Table 1. The coating does not show superhydrophobicity. This result indicates that superhydrophobicity could not be achieved in the absence of a nano-sized ceramic particle (I) in the coating composition.

TABLE 1

| Sample ID | Water Contact Angle (°) Advancing | Receding | Water Roll-off Angle (°) |
|---|---|---|---|
| Example 1 | 166.6 | 160.2 | 3.4 |
| Comparative Example 1 | 165.1 | 164.5 | 4.2 |
| Comparative Example 2 | 162.8 | 88.3 | No roll-off |
| Comparative Example 3 | 166.4 | 116.3 | No roll-off |

The present invention has been described with respect to the above exemplary embodiments, However, as those skilled in the art will recognize, modifications and variation in the specific details which have been described may be resorted to without departing from the spirit and scope of the invention as defined in the appended claims.

What is claimed is:

1. A coating composition capable of forming a durable self-healing superhydrophobic coating, comprising:
   (i) at least one fluorine-containing silane compound (A) of the general formula (1);
   (ii) at least one hydrolysable compound (B) of the general formula (2);
   (iii) at least one polysiloxane compound (C) of the general formula (3);
   (iv) at least one relatively large-sized ceramic particle (I) having an average particle size of 50 to 2000 nm;
   (v) at least one nano-sized ceramic particle (II) having an average particle size of 5 to 200 nm; and
   (vi) at least one solvent;
   wherein the molar ratio of components (A) to (B) ranges from 1:0.5 to 1:10; and the molar ratio of components (A) to (C) ranges from 1:1 to 500:1.

Formula (1):

wherein letter i is 0 or 1, and $R_f$ is $C_nF_{2n+1}$, wherein n is an integer of 1 to 20,
R is a divalent hydrocarbon group having 1 to 10 carbon atoms,
$R^1$ is an alkyl group having 1 to 6 carbon atoms, and
$R^2$ is an alkyl group having 1 to 6 carbon atoms.

Formula (2):

wherein M represents an element selected from the group consisting of Si, Al, Ti, Zr, B, Ge, V, Pb, Sn and Zn,
$R^3$ is a non-hydrolysable group,
X is a hydrolysable group,
letter j is equal to 3 or 4 depending on the valence of M, and
letter k is equal to 0, 1 or 2.

Formula (3):

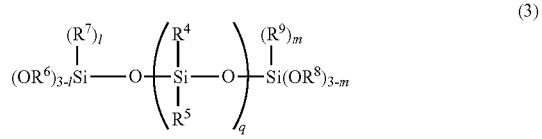

wherein letter l is an integer of 0 to 3, m is an integer of 0 to 3, and q is an integer of 10 to 500,
each of $R^4$ and $R^5$ independently represent an alkyl group having 1 to 6 carbon atoms or a phenyl group,
each of $R^6$, $R^7$, $R^8$ and $R^9$ independently represent an alkyl group having 1 to 6 carbon atoms.

2. The coating composition of claim 1, wherein the fluorine-containing silane compound is selected from the group including heptadecafluoro-1,1,2,2-tetrahydrodecyl-1-triethoxysilane and tridecafluoro-1,1,2,2-tetrahydrooctyl-1-triethoxysilane.

3. The coating composition of claim 1, wherein the particle (I) is selected from the group including $SiO_2$, $Al_2O_3$, $ZrO_2$, ZnO, $TiO_2$, and $SnO_2$.

4. The coating composition of claim 1, wherein the particle (II) is selected from the group including $SiO_2$, $Al_2O_3$, $ZrO_2$, ZnO, $TiO_2$, and $SnO_2$.

5. The coating composition of claim 1, wherein the particle (II) has a particle size of 10 to 80 nm.

6. The coating composition of claim 1, wherein the molar ratio of components (A) to (B) ranges from 1:1 to 1:5.

7. The coating composition of claim 1, wherein the molar ratio of components (A) to (C) ranges from 5:1 to 100:1.

8. The coating composition of claim 1, wherein the M in formula (2) is selected from a group including Si, Al, Ti and Zr and mixtures thereof.

9. The coating composition of claim 1, wherein the compounds (B) are selected from a group including tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n- propyl orthotitanate, tetraethyl zirconate, tetra-iso-propyl zirconate, tetra-n-propyl zirconate, aluminum tri-n-propoxide, aluminium isopropoxide, aluminium sec-butoxide and mixtures thereof.

10. The coating composition of claim 1, wherein the letters l and m in formula (3) are not simultaneously equal to 3.

11. The coating composition of claim 1, wherein the letter q in formula (3) is an integer of 20 to 100.

12. A method for preparing a coating composition capable of forming a durable self-healing superhydrophobic coating comprising:
(a) preparing a precursor solution using compounds (A), (B) and (C) as starting materials, wherein compounds (A), (B) and (C) have the general formula (1), (2) and (3), respectively; the molar ratio of components (A) to (B) ranges from 1:0.5 to 1:10; and the molar ratio of components (A) to (C) ranges from 1:1 to 500:1.

Formula (1):

(1)

wherein letter i is 0 or 1, and $R_f$ is $C_nF_{2n+1}$, wherein n is an integer of 1 to 20,
R is a divalent hydrocarbon group having 1 to 10 carbon atoms,
$R^1$ is an alkyl group having 1 to 6 carbon atoms, and
$R^2$ is an alkyl group having 1 to 6 carbon atoms.

Formula (2):

(2)

wherein M represents an element selected from the group consisting of Si, Al, Ti, Zr, B, Ge, V, Pb, Sn and Zn,
$R^3$ is a non-hydrolysable group,
X is a hydrolysable group,
letter j is equal to 3 or 4 depending on the valence of M, and
letter k is equal to 0, 1 or 2.

Formula (3)

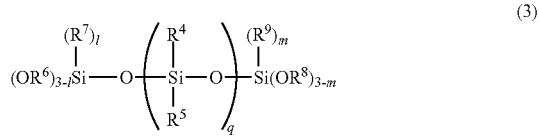

(3)

wherein letter l is an integer of 0 to 3, m is an integer of 0 to 3, and q is an integer of 10 to 500,
each of $R^4$ and $R^5$ independently represent an alkyl group having 1 to 6 carbon atoms or a phenyl group,
each of $R^6$, $R^7$, $R^8$ and $R^9$ independently represent an alkyl group having 1 to 6 carbon atoms.

(b) providing a liquid dispersion of a relatively large-sized ceramic particle (I) having an average particle size of 50 to 2000 nm;
(c) providing a liquid dispersion of a nano-sized particle (II) having an average particle size of 5 to 200 nm;
(d) combining the precursor solution with the two liquid dispersions of ceramic particles to form a coating solution having a pH of about 1-6.5.

13. The method of claim 11, wherein the compounds (A) are selected from the group including heptadecafluoro-1,1,2,2-tetrahydrodecyl-1-triethoxysilane and tridecafluoro-1,1,2,2-tetrahydrooctyl-1-triethoxysilane.

14. The method of claim 11, wherein the particle (I) is selected from the group including $SiO_2$, $Al_2O_3$, $ZrO_2$, ZnO, $TiO_2$, and $SnO_2$.

15. The method of claim 11, wherein the particle (II) is selected from the group including $SiO_2$, $Al_2O_3$, $ZrO_2$, ZnO, $TiO_2$, and $SnO_2$.

16. The method of claim 11, wherein the particle (II) has a particle size of 10 to 80 nm.

17. The method of claim 11, wherein the molar ratio of components (A) to (B) ranges from 1:1 to 1:5.

18. The method of claim 11, wherein the molar ratio of components (A) to (C) ranges from 5:1 to 100:1.

19. The method of claim 11, wherein the M in formula (2) is selected from a group including Si, Al, Ti and Zr and mixtures thereof.

20. The method of claim 11, wherein the compounds (B) are selected from a group including: tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n-propyl orthotitanate, tetraethyl zirconate, tetra-iso-propyl zirconate, tetra-n-propyl zirconate, aluminum tri-n-propoxide, aluminium isopropoxide, aluminium sec-butoxide and mixtures thereof.

21. The method of claim 11, wherein the letters l and m in formula (3) are not simultaneously equal to 3.

22. The method of claim 11, wherein the letter q in formula (3) is an integer of 20 to 100.

\* \* \* \* \*